US008607818B2

(12) United States Patent
Monroe et al.

(10) Patent No.: US 8,607,818 B2
(45) Date of Patent: Dec. 17, 2013

(54) PRESSURE RELIEF VALVE (75) Inventors: James Allen Monroe, Forest Hill, LA (US); Mychal Phillip Spencer, Alexandria, LA (US)

(73) Assignee: Dresser, Inc., Addison, TX (US)

( * ) Notice: Subject to any disclaimer, the term of this patent is extended or adjusted under 35 U.S.C. 154(b) by 517 days.

(21) Appl. No.: 12/784,417

(22) Filed: May 20, 2010

(65) Prior Publication Data

US 2011/0284092 A1   Nov. 24, 2011

(51) Int. Cl.
*F16K 17/20* (2006.01)
(52) U.S. Cl.
USPC ........................................ 137/478; 137/505.14
(58) Field of Classification Search
USPC ............ 137/469, 471, 505.11, 505.3, 505.14, 137/475–478
See application file for complete search history.

(56) References Cited

U.S. PATENT DOCUMENTS

| | | | | |
|---|---|---|---|---|
| 2,517,858 | A * | 8/1950 | Farris | 137/469 |
| 2,672,882 | A * | 3/1954 | Bergquist | 137/478 |
| 2,689,581 | A * | 9/1954 | Davenport | 137/478 |
| 2,799,291 | A * | 7/1957 | Orr et al. | 137/478 |
| 2,821,208 | A * | 1/1958 | Farris | 137/478 |
| 3,001,545 | A * | 9/1961 | Ziege | 137/478 |
| 3,354,900 | A * | 11/1967 | Ferrill | 137/477 |
| 3,520,326 | A * | 7/1970 | Bowen et al. | 137/477 |
| 3,945,607 | A * | 3/1976 | Dashner | 251/357 |
| 4,130,130 | A | 12/1978 | Stewart et al. | |
| 4,357,956 | A | 11/1982 | Anselmann et al. | |
| 4,480,660 | A * | 11/1984 | Bayart et al. | 137/478 |
| 4,481,974 | A | 11/1984 | Schmitt et al. | |
| 4,595,033 | A | 6/1986 | Walsh, Jr. | |
| 4,708,164 | A | 11/1987 | Scallan | |
| 4,770,204 | A * | 9/1988 | Schmitt et al. | 137/469 |
| 4,858,642 | A * | 8/1989 | Fain, Jr. | 137/474 |
| 5,046,524 | A | 9/1991 | Crichton, Jr. | |

(Continued)

FOREIGN PATENT DOCUMENTS

DE   102007049611   4/2009
EP   1849968 A2   10/2007

(Continued)

OTHER PUBLICATIONS

Dresser Consolidated, Safety Relief Valve Parts Catalog, http://www.dresserconsolidated.com/documents/SafetyReliefValvePartsCatalog/SRV_1990_low.pdf.

(Continued)

*Primary Examiner* — Craig Schneider
*Assistant Examiner* — David Colon Morales
(74) *Attorney, Agent, or Firm* — Hiscock & Barclay LLP (57) ABSTRACT

A pressure relief valve includes a base including a fluid inlet and outlet, a nozzle, and a disc. The nozzle includes a substantially annular seat, a substantially cylindrical seat inlet, and a substantially cylindrical bore in fluid communication with the seat inlet. A ratio between a bore diameter and a seat diameter is a constraint ratio. The disc contacts the seat to seal the fluid inlet to substantially prevent fluid communication between the fluid inlet and outlet when the valve is closed. The disc and the disc holder are adapted to be urged by fluidic pressure such that contact between the disc and the seat is removed at the fluidic pressure to allow fluid communication between the fluid inlet and the cavity. Dimensions of the disc, the disc holder, and the nozzle may be functions of the seat diameter and limited by the constraint ratio.

31 Claims, 8 Drawing Sheets

(56) References Cited

U.S. PATENT DOCUMENTS

| | | |
|---|---|---|
| 5,224,511 A | 7/1993 | Schnettler |
| 5,515,884 A | 5/1996 | Danzy et al. |
| 2006/0157116 A1* | 7/2006 | Martin et al. ............... 137/514.5 |
| 2008/0017257 A1* | 1/2008 | Choate et al. ................ 137/540 |

FOREIGN PATENT DOCUMENTS

| | | |
|---|---|---|
| EP | 1852642 A1 | 11/2007 |
| EP | 1857745 A2 | 11/2007 |
| GB | 1179360 A | 1/1970 |
| KR | 100926402 B1 | 11/2009 |
| WO | WO 2011/146192 A1 | 11/2011 |

OTHER PUBLICATIONS

"Crosby" Tyco Flow Control, 2009, 66 pages.
Relief Valve from Wikipedia, http://en.wikipedia.org/wiki/Relief_valve, May 5, 2010, 4 pages.
"Pressure Relief Valves" Valve Selection Handbook, pp. 169-213.
International Patent Application No. PCT/US11/032906: International Search Report dated Sep. 15, 2011, pp. 4.

\* cited by examiner

PRESSURE RELIEF VALVE

TECHNICAL BACKGROUND

This disclosure relates to pressure relief valves, and more particularly, to pressure relief valves suitable for use in multiple service applications.

BACKGROUND

Typically, a pressure relief valve may be used to control or limit pressure in a system or vessel, which can build up by, for example, a process upset, instrument or equipment failure, or fire. The pressure may be relieved by allowing the pressurized fluid to flow from an auxiliary passage through the pressure relief valve and out of the system. The pressure relief valve may be designed or set to open at a predetermined set pressure to protect pressure vessels and other equipment from being subjected to pressures that exceed their design limits.

In some cases, a pressure relief valve may incorporate a nozzle responsible for directing fluid flow from a piping to exhaust system during an overpressure situation. The smallest diameter in the nozzle (i.e., the "controlling diameter," or bore) may be at least partly responsible for the flow or relieving capacity of the pressure relief valve. In addition, due to the difference in fluid properties between compressible (e.g., gas) and incompressible (e.g., liquid) fluid media, one or more components of the pressure relief valve may need to be replaced and/or adjusted depending on the fluid media type (i.e., compressible or incompressible). Such a change in component(s) (such as, for example, a disc holder) may be necessary due to different force response each fluid applies to a "mass-spring-damper" system of the pressure relief valve.

Further, the operation of the mass-spring damper system may be relevant in meeting or exceeding certain regulatory requirements of pressure relief valves. For example, such regulatory requirements may place limits on a set pressure tolerance (e.g., ±2 psi or ±3% of set pressure), blowdown (e.g., less than or equal to 3 psi or 7% of set pressure), pressure relief valve relief operation (e.g., at or above certified capacity at 10% above the set pressure), and "chatter" or "flutter" (e.g., no "chatter" or "flutter" during normal pressure relief valve operation). For purposes of the present disclosure, "set pressure" may be defined as an inlet pressure at which the pressure relief valve commences to open under service conditions (i.e. first measurable lift). Also, for purposes of the present disclosure, "blowdown" may be defined as a difference between the set pressure and a pressure at resealing of the pressure relief valve, expressed as a percentage of the set pressure. Further, for purposes of the present disclosure, "chatter" may be defined as an abnormal, reciprocating motion of the movable parts of the pressure relief valve in which a disc contacts a nozzle of the pressure relief valve, and "flutter" may be defined as an abnormal, rapid reciprocating motion of the movable parts of the pressure relief valve in which the disc does not contact the nozzle.

SUMMARY

In one general embodiment, a pressure relief valve includes a base, a bonnet, a nozzle, and a disc. The base includes a fluid inlet and a fluid outlet. The bonnet is attached to the base, and the base and the bonnet define a cavity in fluid communication with the fluid inlet and the fluid outlet. The nozzle is disposed within the fluid inlet and attached to the base, and the nozzle includes a substantially annular seat, a substantially cylindrical seat inlet, and a substantially cylindrical bore in fluid communication with the seat inlet. A ratio between a bore diameter and a seat diameter is a constraint ratio. The disc is disposed within a disc holder and includes a surface facing the fluid inlet to receive a first fluidic pressure against the surface. The disc is adapted to contact the seat and seal the fluid inlet to substantially prevent fluid communication between the fluid inlet and the cavity when the valve is in a closed position. The disc and the disc holder are adapted to be urged by an increase of the first fluidic pressure to a second fluidic pressure such that contact between the disc and the seat is removed at the second fluidic pressure to allow fluid communication between the fluid inlet and the cavity. One or more dimensions of at least one of the disc, the disc holder, and the nozzle are functions of the seat diameter and limited by the constraint ratio.

In another general embodiment, a pressure relief valve includes a base including a fluid inlet and a fluid outlet, a bonnet attached to the base, and a pressure control system. The valve has a set pressure substantially equal to a pressure at the fluid inlet at which fluid communication is established between the fluid inlet and the fluid outlet. The valve has a resealing pressure substantially equal to a pressure at the fluid inlet at which fluid communication is substantially ceased between the fluid inlet and the fluid outlet. The base and the bonnet define a cavity in fluid communication with the fluid inlet and the fluid outlet. The pressure control system is configured to receive a first fluid and regulate the first fluid such that a difference between the set pressure and the resealing pressure is within a predetermined percentage of the set pressure during operation of the valve with the first fluid. The first fluid is one of substantially all gas or substantially all liquid. The pressure control system is configured to receive a second fluid and regulate the second fluid such that a difference between the set pressure and the resealing pressure is within the predetermined percentage of the set pressure during operation of the valve with the second fluid. The second fluid is substantially all liquid if the first fluid is substantially all gas and substantially all gas if the first fluid is substantially all liquid.

In another general embodiment, a method for using a pressure relief valve having a base including a fluid inlet and a fluid outlet; a set pressure substantially equal to a pressure at the fluid inlet at which fluid communication is established between the fluid inlet and the fluid outlet; and a resealing pressure substantially equal to a pressure at the fluid inlet at which fluid communication is substantially ceased between the fluid inlet and the fluid outlet, includes the steps of providing a liquid to the fluid inlet such that a difference between the set pressure and the resealing pressure is within a predetermined percentage of the set pressure during operation of the valve with the liquid; and without modifying the valve, providing a gas to the fluid inlet such that a difference between the set pressure and the resealing pressure is within the predetermined percentage of the set pressure during operation of the valve with the gas.

In another general embodiment, a method for using a pressure relief valve having a base including a fluid inlet and a fluid outlet; a set pressure substantially equal to a pressure at the fluid inlet at which fluid communication is established between the fluid inlet and the fluid outlet; and a resealing pressure substantially equal to a pressure at the fluid inlet at which fluid communication is substantially ceased between the fluid inlet and the fluid outlet, includes the steps of providing a gas to the fluid inlet such that a difference between the set pressure and the resealing pressure is within a predetermined percentage of the set pressure during operation of the valve with the gas; and without modifying the valve, providing a liquid to the fluid inlet such that a difference between the set pressure and the resealing pressure is within the predetermined percentage of the set pressure during operation of the valve with the liquid.

In one aspect of one or more general embodiments, the constraint ratio may be a range between approximately 0.7500 and approximately 0.9850, inclusive.

In one aspect of one or more general embodiments, the valve may have a set pressure substantially equal to the second fluid pressure and the valve may have a resealing pressure substantially equal to a third fluid pressure at the fluid inlet at which fluid communication is substantially ceased between the fluid inlet and the fluid outlet. A difference between the set pressure and the resealing pressure may be within approximately 7% of the set pressure during operation of the valve with a gas fluid when the constraint ratio is within the range.

In one aspect of one or more general embodiments, the valve may have an overpressure substantially equal to approximately 110% of the set pressure, and fluid communication between the fluid inlet and the fluid outlet may reach a full capacity flow rate of the valve at the overpressure when the constraint ratio is within the range.

In one aspect of one or more general embodiments, the valve may have a set pressure substantially equal to the second fluid pressure, and the valve may have a resealing pressure substantially equal to a third fluid pressure at the fluid inlet at which fluid communication is substantially ceased between the fluid inlet and the fluid outlet. A difference between the set pressure and the resealing pressure may be within approximately 10% of the set pressure during operation of the valve with a liquid fluid when the constraint ratio is within the range.

In one aspect of one or more general embodiments, an ideal constraint ratio may be approximately 0.9617.

In one aspect of one or more general embodiments, one or more dimensions of at least one of the disc, the disc holder, and the nozzle may be related to the seat diameter through empirically-derived constraint equations based on the constraint ratio.

In one aspect of one or more general embodiments, the constraint equations may include one or more of the following: an outer diameter of the disc holder is substantially equal to 1.8611 times the seat diameter; a disc holder outer angle start diameter is substantially equal to 1.6937 times the seat diameter; a disc holder inner angle start diameter is substantially equal to 1.2404 times the seat diameter; a disc diameter is substantially equal to 1.1763 times the seat diameter; a disc inner angle start diameter is substantially equal to 0.9466 times the seat diameter; a seat land outer diameter is substantially equal to 1.0899 times the seat diameter; an outer diameter of the nozzle is substantially equal to 1.2734 times the seat diameter; an outer diameter of a land of an adjusting ring is substantially equal to 1.3606 times the seat diameter; an outer diameter of the adjusting ring is substantially equal to 1.4470 times the seat diameter; a distance to the inner angle start diameter is substantially equal to 0.1790 times the seat diameter; a distance to the outer angle start diameter is substantially equal to 0.1122 times the seat diameter; a disc relief depth is substantially equal to 0.02671 times the seat diameter; a height of the land of the adjusting ring is substantially equal to 0.02850 times the seat diameter; a height of top ridge of the nozzle is substantially equal to 0.03117 times the seat diameter; and a distance from a disc seat to a first step of the disc holder out of a pocket is substantially equal to 0.03206 times the seat diameter.

In one aspect of one or more general embodiments, the constraint equations may include one or more of the following: an outer angle on the disc holder is substantially equal to 72 degrees; an inner angle on the disc holder is substantially equal to 30 degrees when the constraint ratio is between approximately 0.9500 and approximately 0.9850, inclusive, and the inner angle on the disc holder is substantially equal to −101.1927 times the constraint ratio plus 127.3180 degrees when the constraint ratio is between approximately 0.7500, inclusive, and approximately 0.9500; a disc inner angle is substantially equal to 45 degrees; a transition angle of an adjusting ring is substantially equal to 30 degrees; and a bore to seat transition angle is substantially equal to 45 degrees.

In one aspect of one or more general embodiments, the valve may include an adjusting ring having a bore for receiving the nozzle therethrough. The difference between the set pressure and the resealing pressure may be based, at least in part, on the position of the adjusting ring on the nozzle.

In one aspect of one or more general embodiments, the pressure control system may include a nozzle extending from an exterior of the base through the fluid inlet and into the cavity and having a seating surface along a top of the nozzle; a disc having a landing surface adapted to sealingly engage the seating surface such that fluid communication between the fluid inlet and the cavity is substantially prevented; and a disc holder disposed within the cavity and having an aperture adapted to engage and hold the disc.

In one aspect of one or more general embodiments, the nozzle may include a seat inlet having a seat diameter and a bore portion having a bore diameter, and a ratio between the bore diameter and the seat diameter is a constraint ratio.

In one aspect of one or more general embodiments, providing a liquid to the fluid inlet such that a difference between the set pressure and the resealing pressure is within a predetermined percentage of the set pressure during operation of the valve with the liquid may include providing a liquid to the fluid inlet such that a difference between the set pressure and the resealing pressure is within a first predetermined percentage of the set pressure during operation of the valve with the liquid. Providing a gas to the fluid inlet, without modifying the valve, such that a difference between the set pressure and the resealing pressure is within the predetermined percentage of the set pressure during operation of the valve with the gas may include providing a gas to the fluid inlet, without modifying the valve, such that a difference between the set pressure and the resealing pressure is within a second predetermined percentage of the set pressure during operation of the valve with the gas.

In one aspect of one or more general embodiments, the first predetermined percentage may be approximately equal to 10%, and the second predetermined percentage may be approximately equal to 7%.

In one aspect of one or more general embodiments, the valve may further include a nozzle disposed in the fluid inlet and an adjusting ring disposed around an outer surface of the nozzle at a first position, such that the difference between the set pressure and the resealing pressure is within the predetermined percentage of the set pressure during operation of the valve with the liquid and the gas when the adjusting ring is at the first position. Adjusting the adjusting ring along the nozzle in a direction toward the fluid inlet to a second position different from the first position may cause the difference between the set pressure and the resealing pressure to be within a second percentage of the set pressure less than the predetermined percentage during operation of the valve with the liquid and the gas when the adjusting ring is at the second position.

In one aspect of one or more general embodiments, the predetermined percentage may be approximately 10 percent.

In one aspect of one or more general embodiments, providing a gas to the fluid inlet such that a difference between the set pressure and the resealing pressure is within a predetermined percentage of the set pressure during operation of the valve with the gas may include providing a gas to the fluid inlet such that a difference between the set pressure and the resealing pressure is within a first predetermined percentage of the set pressure during operation of the valve with the gas. Providing a liquid to the fluid inlet, without modifying the valve, such that a difference between the set pressure and the resealing pressure is within the predetermined percentage of the set pressure during operation of the valve with the liquid may include providing a liquid to the fluid inlet, without modifying the valve, such that a difference between the set pressure and the resealing pressure is within a second predetermined percentage of the set pressure during operation of the valve with the liquid.

In one aspect of one or more general embodiments, the first predetermined percentage may be approximately equal to 7%, and the second predetermined percentage may be approximately equal to 10%.

Various implementations of a pressure relief valve (PRV) according to the present disclosure may include one or more of the following features. For example, the PRV may obtain industry performance specifications (e.g., ASME Section VIII and/or API Stds. 521, 526, and/or 527) with respect to several properties (i.e., relieving capacity, blowdown, set point tolerance, and chatter) on both compressible and incompressible media. The PRV may obtain such specification on both compressible and incompressible media. For instance, the PRV may allow for switching between media without making any adjustments to components of the PRV. As another example, the PRV may obtain such specification on both compressible and incompressible media without adjustment of a disc and/or disc holder. Further, the PRV may obtain such specification on both compressible and incompressible media without adjustment of or modification of an adjusting ring of the PRV.

Various implementations of a pressure relief valve (PRV) according to the present disclosure may also include one or more of the following features. The PRV may include optimal geometrical dimensions of one or more components, such as a disc, a disc holder, a nozzle, and/or an adjusting ring, as well as other components. The PRV may include such optimal dimensions based on a dimensional ratio of a bore and a seat of the PRV. As another example, the PRV may allow for increased manufacturing efficiency, by reducing the number of different valve components necessary to meet a variety of different services. The PRV may also allow for reduced inventory by allowing valve users to maintain a single PRV operable for both liquid and gas service. As another example, the PRV may provide for better performance (e.g., less chatter) in a liquid service as compared to a typical pressure relief valve specifically designed for gas service. Further, the PRV may provide for better performance (e.g. shorter blowdown) in a gas service as compared to a typical pressure relief valve specifically designed for liquid service. As yet another example, the PRV may have improved set pressure tolerance, including improved tolerance between different media types, as compared to conventional pressure relief valves. Also, the PRV may facilitate improved flow capacity as compared to conventional pressure relief valves.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DETAILED DESCRIPTION

A pressure relief valve (PRV) according to the present disclosure may include a disc, a disc holder, a nozzle, and a mass-spring-damper system that allows for a fluid (e.g., gas, liquid, or multiphase fluid) within a system, such as a piping system or pressure vessel, to be relieved by operation of the PRV when the fluidic pressure of the fluid exceeds a predetermined threshold. In some embodiments, the PRV may be used for liquid, gas, and multiphase applications while meeting one or more industry performance criteria (e.g., blowdown, set pressure tolerance, relief operation, and other criteria) without changing any components of the PRV for the specific service media, such as the disc holder, the disc, or other components. In some embodiments, one or more geometrical relationships between and/or among the components of the PRV may allow for dual operation between liquid and gas media without modifications of such components between such operation.

Figure 1A:
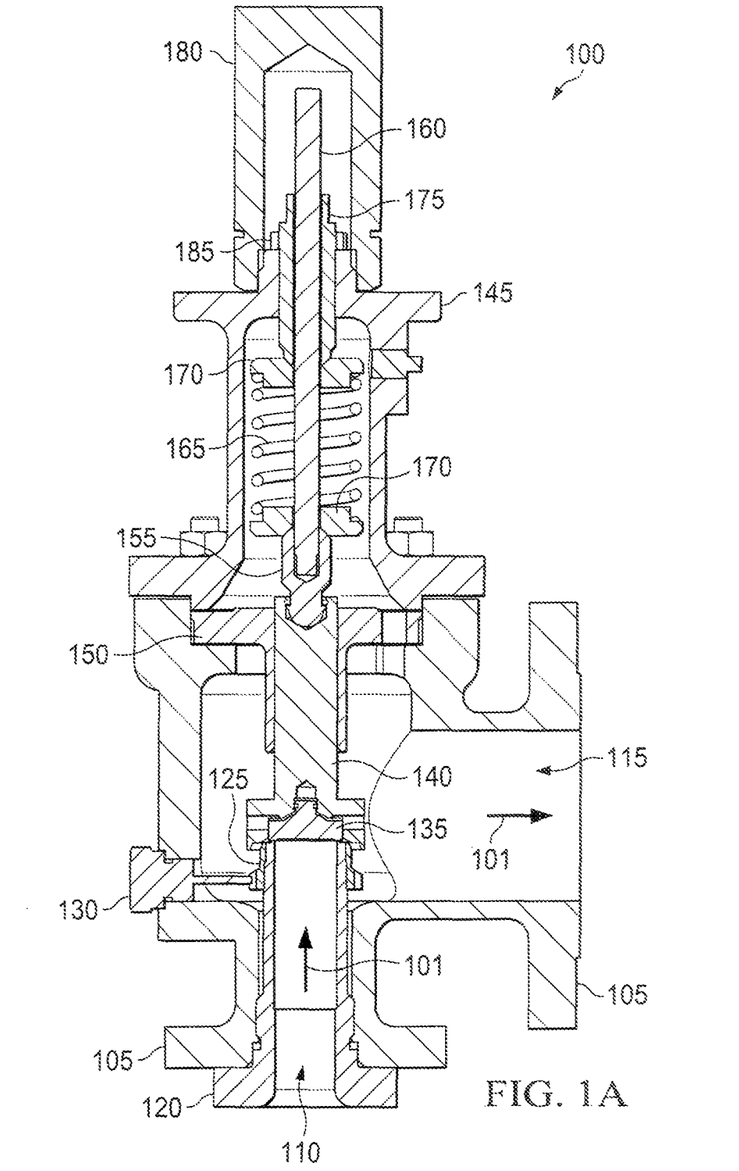
FIGS. 1A-B illustrate sectional views of one implementation of a pressure relief valve (PRV) in accordance with the present disclosure.
Figure 1B:
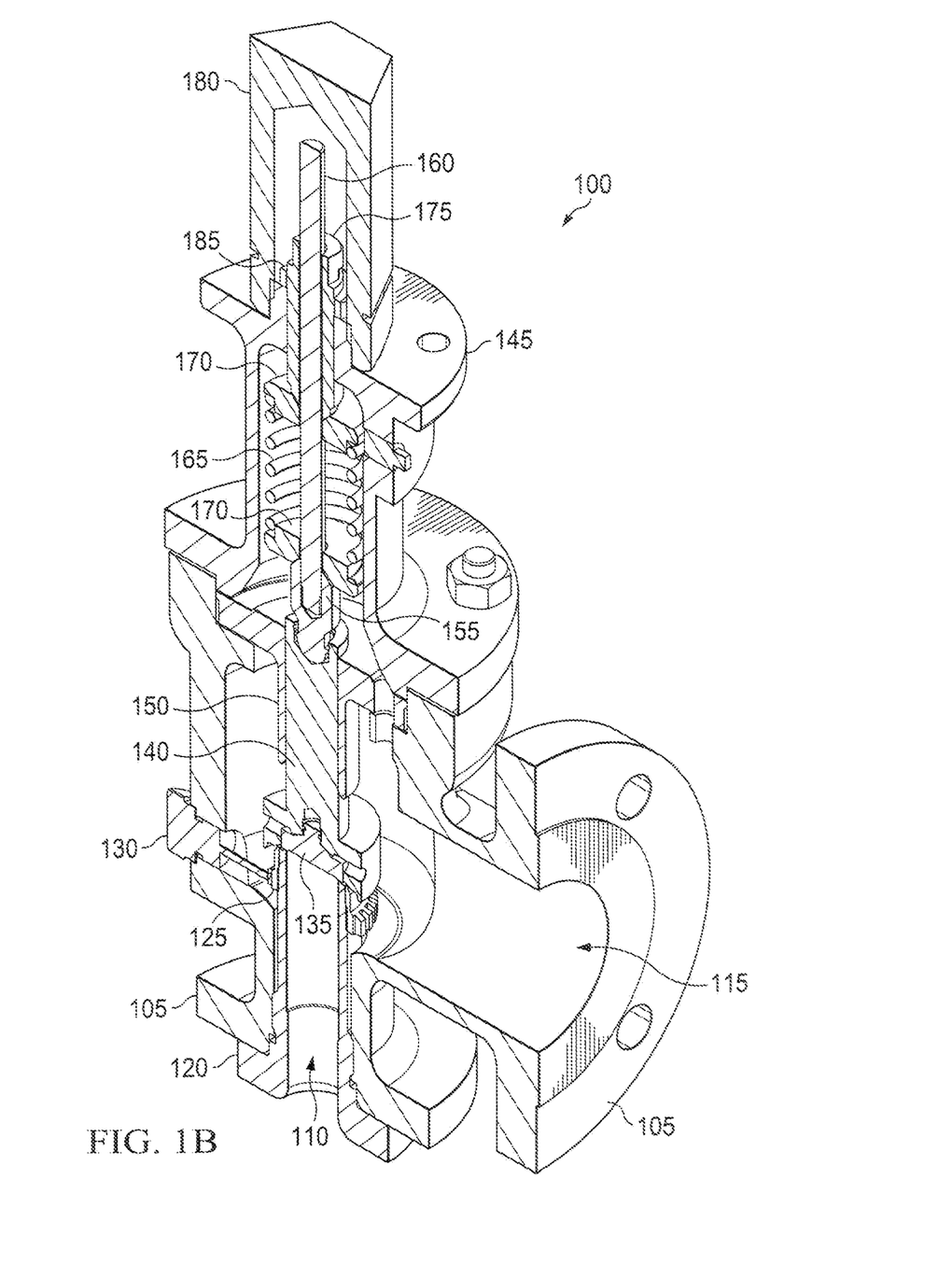

FIGS. 1A-B illustrate sectional views of one implementation of a pressure relief valve (PRV) 100. Generally, PRV 100 receives a fluid 101 (e.g., gas or liquid or a multiphase fluid) at and through an inlet 110 and directs the fluid 101 to and through an outlet 115 of the PRV 100 in order to relieve a pressure within a system. For example, the PRV 100 is typically in fluid communication with components, such as pressure vessels, heat exchangers, mechanical equipment (e.g., compressors, turbines and others) within a piping or conduit system and may be used to control or limit a pressure in such a system, including such vessels, heat exchangers, and/or equipment, which can build up by a process upset, instrument or equipment failure, fire, or other incident. Pressure is relieved through the operation of PRV 100 by allowing the pressurized fluid to flow from the inlet 110 through the outlet 115 at a predetermined pressure set point. For instance, the PRV 100 may be designed or set to open at a predetermined set pressure to protect pressure vessels and other equipment from being subjected to pressures that exceed their design limits.

PRV 100 includes a base 105 at least partially enclosing a nozzle 120, and enclosing an adjusting ring 125, a disc 135, and a disc holder 140. The base 105 receives (e.g., threadingly) the nozzle 120 at the inlet 110 of the PRV 100 and, in the illustrated embodiment, includes a flanged connection at the outlet 115. The nozzle 120, generally, may be a pressure containing component in constant contact with the fluid 101 in both the open and closed positions of PRV 100 (shown in more detail in FIGS. 2A-C).

The base 105 may also include a flanged connection at the inlet 110 or, alternatively, may include other connection mechanisms (e.g., grooved pipe connection, butt weld, or otherwise) at one or both of the inlet 110 and outlet 115. In some embodiments, a portion of the base 105 adjacent the outlet 115 may have a lower pressure rating than a portion of the base 105 adjacent the inlet 110 because of, for example, a decrease in fluidic pressure of the fluid 101 at the outlet 115 relative to the inlet 110.

PRV 100 also includes a cap 180 and a bonnet 145 enclosing (at least partially) a spindle 160, which is threadingly engaged through one or more of a lock nut 185, an adjusting screw 175, spring washers 170, a spring 165, and a spindle head 155. Generally, the bonnet 145 is mechanically coupled (e.g., by one or more bolts and locking nuts) at one end to the base 105 while the cap 180 is mechanically coupled (e.g., threadingly) to the bonnet 145 at a second end. The adjusting screw 175, rigidly coupled to the bonnet 145 via the lock nut 185, guidingly allows the spindle 160 to oscillate vertically within the cap 180 and bonnet 145 during operation of the PRV 100.

The PRV 100 also includes a guide 150 that receives at least a portion of the disc holder 140 therethrough. Typically, the disc 135, disc holder 140, spring washers 170, spindle 160, spindle head 155, and spring 165 comprise a "mass-spring-damper" system that works to respond to fluidic forces applied by the fluid 101 as it contacts the disc 135 through the nozzle 120. The disc holder 140 includes a receiving aperture at a top end to receivingly engage the spindle head 155 such that force may be transmitted from the disc holder 140 to the spindle head 155 and, thus, to the spring washers 170 and spring 165. For example, when an upward fluidic force greater than the spring force of the spring 165 is applied to the disc 135 (and is thus transmitted through the disc holder 140, the spindle head 155, and the spring washer 170 to the spring 165), the spring 165 may be compressed, thereby urging the spindle 160 upward through the adjusting screw 175. Likewise, as the spring force of the spring 165 is greater than the fluidic force, the spring 165 expands, thereby urging the spindle 160 (and spindle head 155, disc holder 140, and disc 135) downward.

Adjusting ring 125 is engaged (e.g., threadingly) with a top portion of the nozzle 120. Typically, adjusting ring 125 may be adjusted upward and/or downward on the nozzle 120 by threading or unthreading the ring 125 on the nozzle 120. By adjusting the location (i.e., height) of the adjusting ring 125 relative to a top end of the nozzle 120, blowdown, or reseating pressure, may also be adjusted. For example, when the adjusting ring 125 is moved upward, blowdown is increased thereby lowering the reseating pressure. Alternatively, when the adjusting ring 125 is moved downward, the blowdown is decreased, thereby raising the resealing pressure. In some embodiments, the adjusting ring 125, and therefore the PRV 100, may be preset at a predetermined position prior to putting the PRV 100 in service. In such embodiments, presetting may reduce the necessity of "popping" (i.e., applying the set pressure to the PRV 100, such that significant lift of the disc and/or disc holder is obtained) the PRV 100 in service to ascertain that the adjusting ring 125 has been set properly for attaining the necessary lift and relieving capacity.

A ring pin 130 extends from a location external to the base 105, through the base 105, and operates to secure the adjusting ring 125 at a certain location (e.g., vertical position) on the nozzle 120. When the ring pin 130 is rotatably removed or partially removed from the base 105, the adjusting ring 125 may be adjusted (i.e., moved upward or downward). For example, the adjusting ring 125 may have multiple vertical grooves arranged circumferentially around an outer surface of the ring 125. In some embodiments, the adjusting ring 125 has 30 grooves; alternatively, the adjusting ring 125 may have fewer or more grooves (e.g. 16, 42, or other number of grooves). The ring pin 130 includes a pointed tip configured to fit within a groove (e.g., approximately halfway between peaks and a valley between two grooves) and substantially prevents the adjusting ring 125 from vertical movement along the nozzle 120 through rotation of the adjusting ring 125 around the nozzle 120. For example, in one implementation of the adjusting ring 125 including 30 grooves, adjusting the ring pin 130 between adjacent grooves may allow for approximately 12 degrees of rotation of the adjusting ring 125, which translates to approximately $^2/_{1000}$ inch vertical movement of the adjusting ring 125 along the nozzle 120.

Figure 2A:
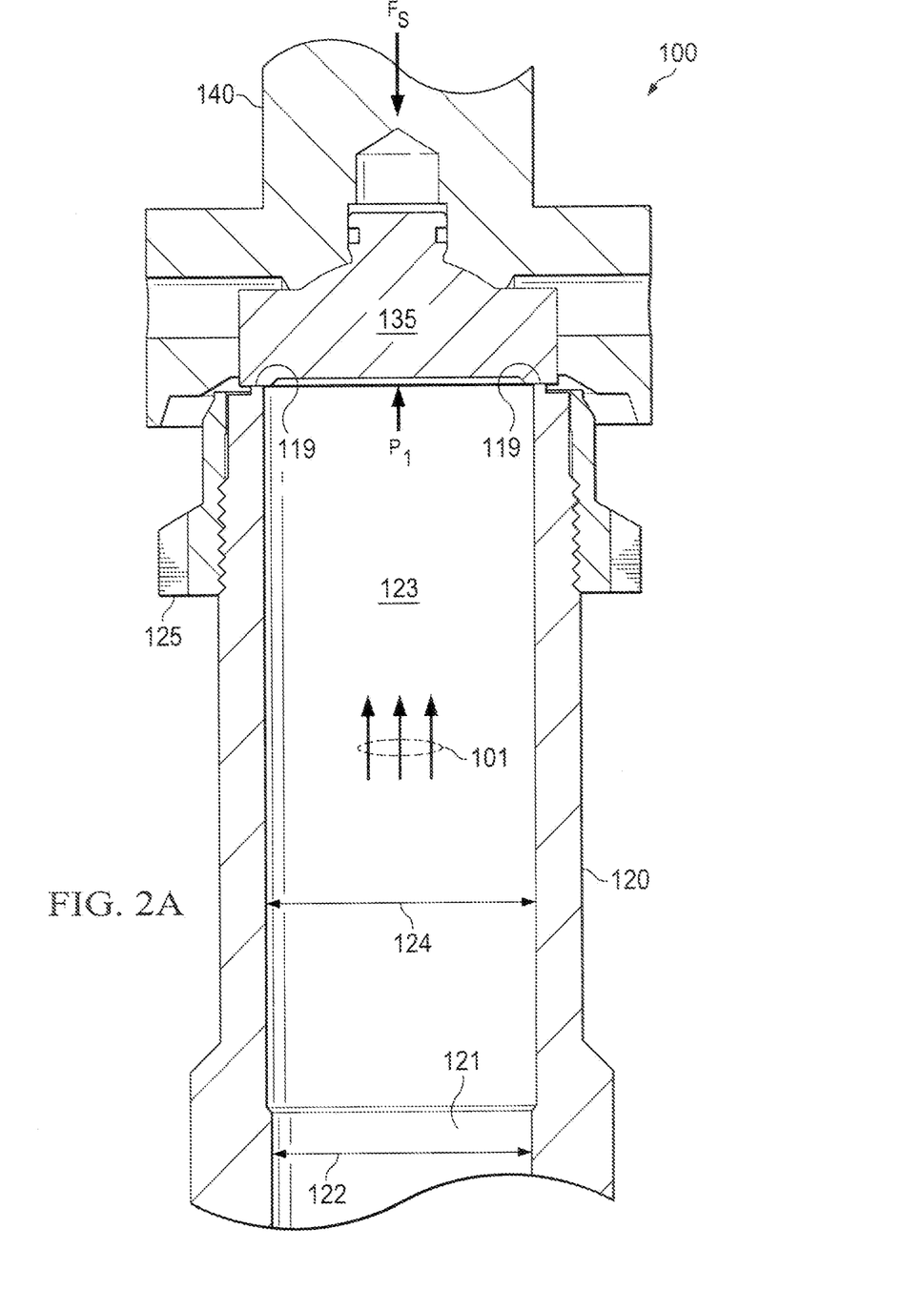
FIGS. 2A-C illustrate sectional views of certain components of one implementation of a PRV, including a disc holder, a disc, an adjusting ring, and a nozzle, at various stages of operation in accordance with the present disclosure.
Figure 2B:
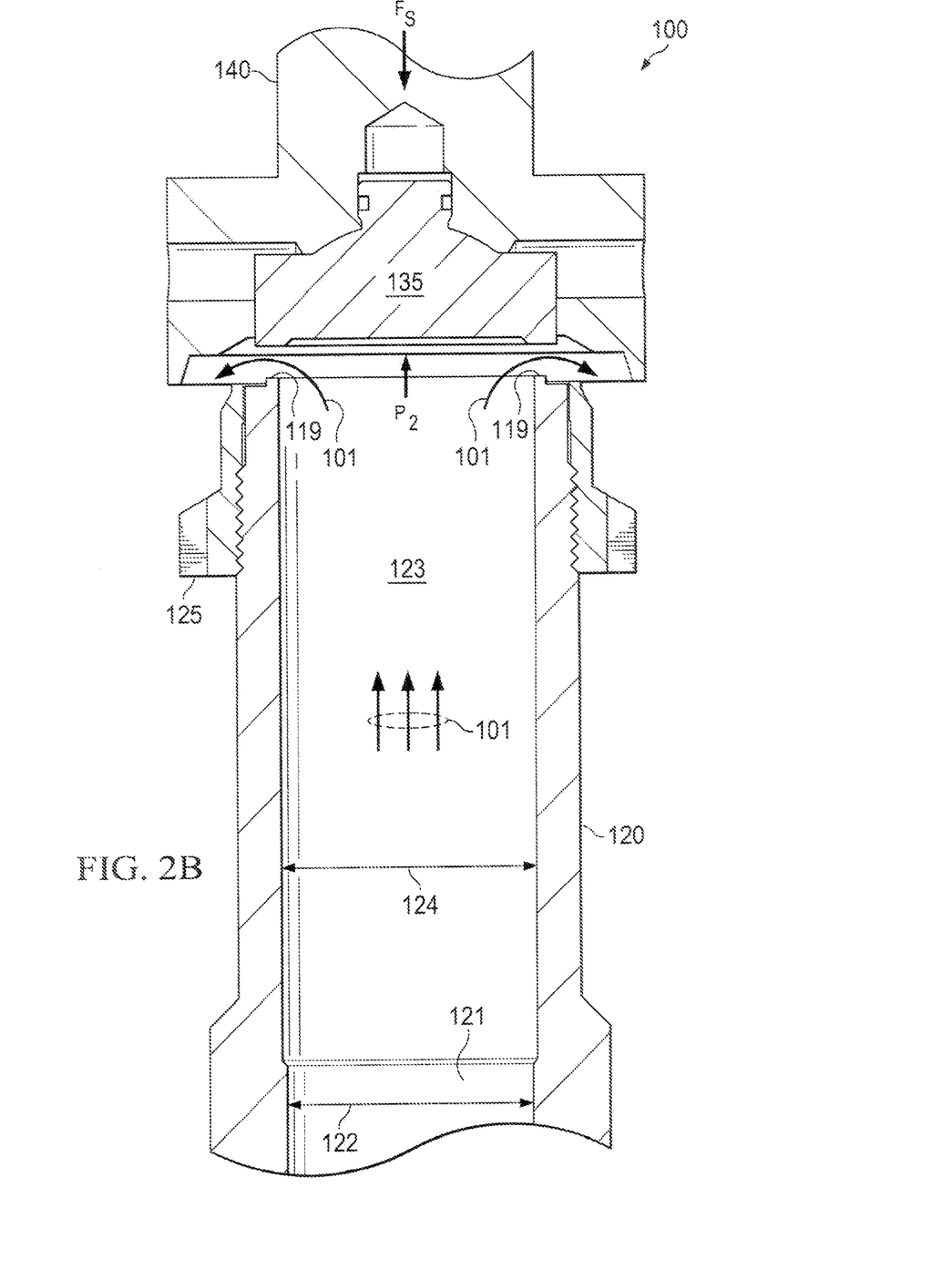
Figure 2C:
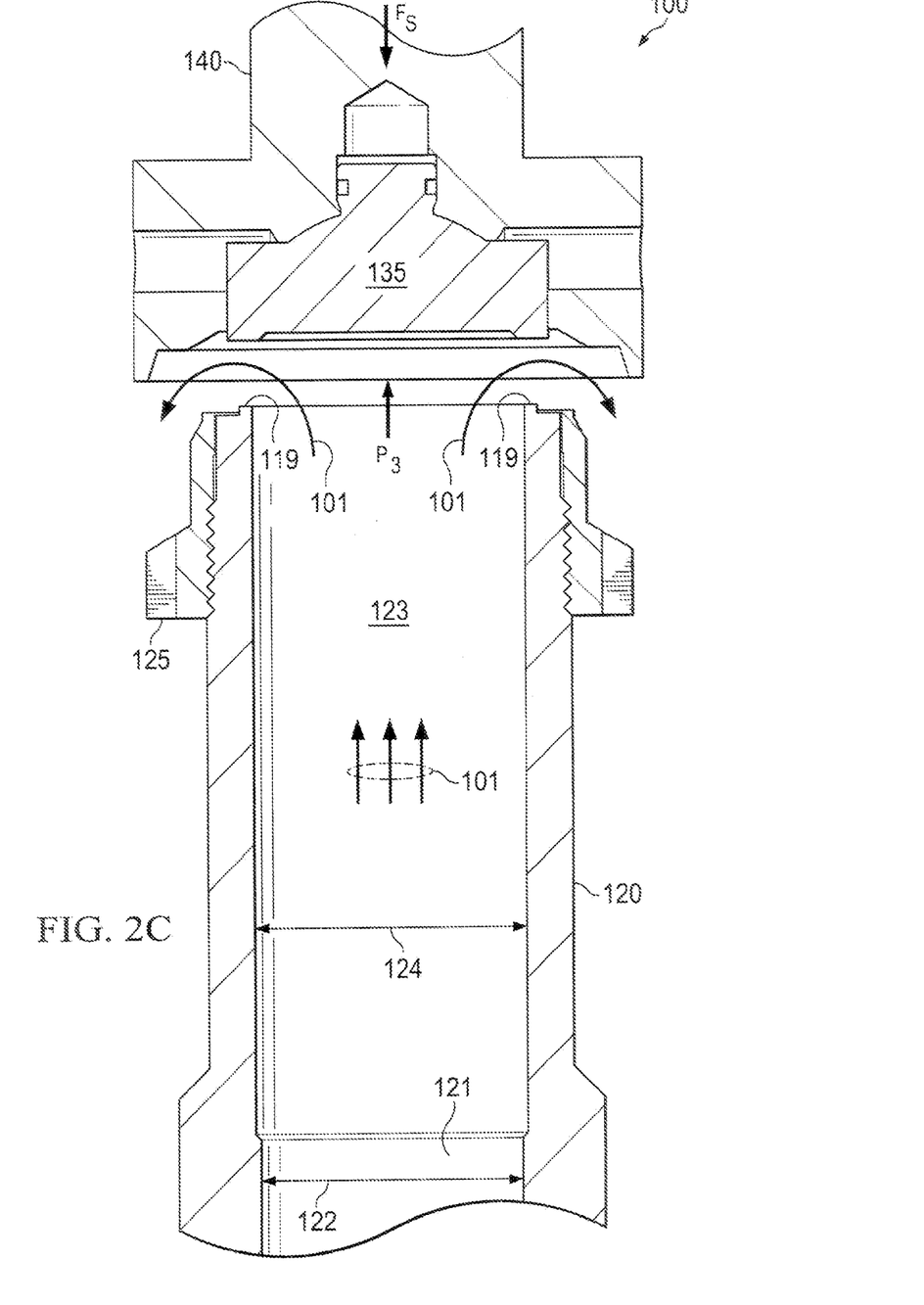

FIGS. 2A-C illustrate sectional views of certain components of one implementation of PRV 100, including the disc holder 140, the disc 135, the adjusting ring 125, and the nozzle 120, at various stages of operation. Turning particularly to FIG. 2A, this figure illustrates the disc holder 140, the disc 135, the adjusting ring 125, and the nozzle 120 at a closed state of the PRV 100. The closed state may occur, for example, when a fluidic pressure $P_1$ applied to an area of the disc 135 constrained by the seat diameter 124 is less than the spring force $F_S$ of the spring 165 opposing the pressure $P_1$. In the closed state, all or substantially all of the fluid 101 entering the inlet 110 may be contained in the nozzle 120. In other words, no or substantially no fluid 101 is transmitted from the inlet 110 to the outlet 115 when the PRV 100 is in the closed state. Further, as illustrated, the disc 135 may be contact with (i.e., seated on) a top surface of the nozzle 120 when the PRV 100 is in the closed state.

FIGS. 2A-C (as well as FIGS. 3A-C) also illustrate a bore 121 of the nozzle 120 with a bore diameter 122. As illustrated, the bore 121 is disposed in a lower portion of the nozzle 120 directly adjacent the inlet 110, while a seat inlet 123 is disposed in an upper portion of the nozzle 120 adjacent the disc 135. The top surface of the nozzle 120 adjacent the seat inlet 123 is the seat 119. In some implementations, such a configuration (which may be opposite to that found in conventional pressure relief valves) may include several advantages. For example, by locating the bore 121 adjacent the inlet 110 rather than adjacent the disc 135, the PRV 100 may reduce chatter, reduce and/or eliminate cavitation, improve capacity control, and reduce acoustic noise. Further, in the illustrated embodiment, fluid flow through the nozzle 120 may be more stable due to, at least in part, the location of the bore 121 and seat inlet 123 as compared to conventional pressure reducing valves.

Turning particularly to FIG. 2B, this figure illustrates the disc holder 140, the disc 135, the adjusting ring 125, and the nozzle 120 at a partially open state of the PRV 100. In some embodiments, the partially open state may occur, for example, when a fluidic pressure $P_2$ acting on the disc 135 by the fluid 101 is within, e.g., one to two percent of the set pressure of the PRV 100 (which is related to the spring force $F_S$). At the partially open state, the disc 135 may be unseated from the nozzle 120, thereby allowing a small portion of fluid 101 to flow into a region between the disc holder 140 and the nozzle 120. Thus, the fluid 101 may act (i.e., apply pressure $P_2$) on a surface area including the disc 135 and a portion of the disc holder 140. Since the pressure $P_2$ can now act over a larger area (relative to the area acted upon by $P_1$), the force opposed to the spring force $F_S$ of the spring 165 may continue to build in order to move the PRV 100 from the partially open state to an open state.

In some embodiments, adjustment of the adjusting ring 125 (i.e., upward or downward) may adjust the surface area acted upon by the pressure $P_2$ when the PRV 100 is in the partially open state. By adjusting the adjusting ring 125, the build-up of pressure $P_2$ may be controlled and, eventually, may overcome the spring force $F_S$, causing the disc 135 to move upward away from the nozzle 120.

In some embodiments of the PRV 100 in gas service, depending on a tightness of the seal between the disc 135 and the nozzle 120 and a height of the adjusting ring 125, the PRV 100 may or may not open slightly prior to obtaining a full lift (i.e., an open state). In other words, the height of the adjusting ring 125 may control or partially control an initial leak of fluid 101 (i.e., "simmer"). In some cases, simmer may be less than 2% for the PRV 100 (i.e., audible leak or measurable lift not before 98% of set point pressure).

By moving the adjusting ring 125 up relative to the nozzle 120 in gas service, differential pressure may be created and more fluid energy is transferred from the fluid 101 (as a gas) to the disc 135 and thus disc holder 140 and other components. This may cause the disc 135 to lift from the nozzle 120 sooner. While in some cases, flow of the fluid 101 through the nozzle 120 and to the fluid outlet 115 at a small lift amount may create an insignificant force, the creation of additional force to provide for additional lift may be caused by an additional area on which fluidic force may be applied onto the disc 135 and/or disc holder 140 due to an orifice between the adjusting ring 125 and the disc holder 140. In contrast, on gas service, when the adjusting ring 125 is lower relative to the nozzle 120, the pressure differential may be less and simmer may increase.

In some embodiments of the PRV 100 in liquid service, the PRV 100 may open due to a momentum transfer, for example, due to the nearly incompressible behavior of liquids. For example, as pressure increases above a set point pressure and the disc 135 lifts off the nozzle 120, the fluid 101 (as a liquid) flows out of an initially small area (shown in FIG. 2B). This fluid 101 may not add much to the force due to the low fluid velocity. As pressure increases and fluid velocity of the fluid 101 (as a liquid) increases, more momentum may transferred to the disc 135 and thus disc holder 140 and other components. A critical lift may be reached when the fluid flow is directed such that momentum is maximum. At this point, the force transfer from the fluid 100 to the disc 135 and thus disc holder 140 and other components may be at a maximum and the PRV 100 goes into full lift into the open position (shown in FIG. 2C).

Due to the above-described behavior in liquid service, at least in part, certain industry specifications may require flow capacity of a pressure relief valve, such as the PRV 100, to be achieved by 10% overpressure (e.g., 110% of set pressure). In contrast, this requirement may not be needed for gas service since full lift is obtained much closer to the set point pressure. The adjusting ring 125, for liquid service, may be used to direct the flow of fluid 101, as opposed to creating pressure differentials as in gas service.

Turning particularly to FIG. 2C, this figure illustrates the disc holder 140, the disc 135, the adjusting ring 125, and the nozzle 120 at an open state of the PRV 100. In some embodiments, the open state may occur, for example, when a fluidic pressure $P_3$ acts on the surfaces of the disc 135 and disc holder 140 adjacent the adjusting ring 125 exposed to the fluid 101 at a greater force than the spring force $F_S$. For example, once the PRV 100 has attained the partially open state, an additional pressure build-up due to a sudden flow increase and a restriction to flow through an orifice between the disc holder 140 and an outside diameter of the adjusting ring 125 may cause the disc 135 to lift substantially away from the nozzle 120. Flow may be restricted by the opening between the nozzle 120 and disc 135 until the disc 135 has been lifted from the nozzle 120 a distance substantially equal to a vertical height of approximately one-quarter of the bore diameter 122 in gas service. Flow may be restricted by the opening between the nozzle 120 and disc 135 until the disc 135 has been lifted from the nozzle 120 a distance substantially equal to a vertical height of approximately one-third of the bore diameter 122 in liquid service. Subsequently, after the disc 135 has attained this degree of lift, flow is then restricted by the bore 121 rather than by the area between the nozzle 120 and disc 135.

Figure 3A:
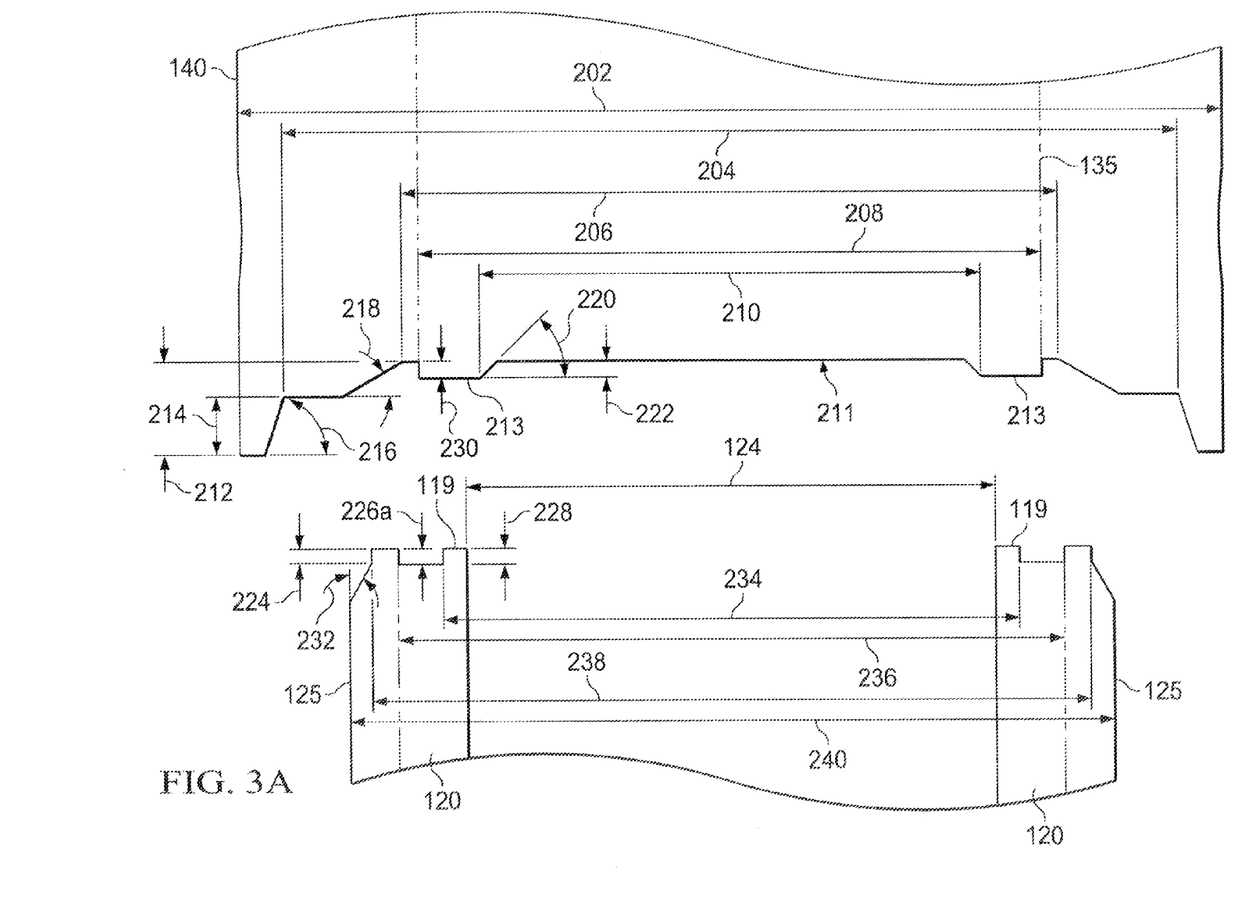
FIGS. 3A-F illustrate geometrical dimensions of one or more components of one implementation of a PRV in accordance with the present disclosure.
Figure 3B:
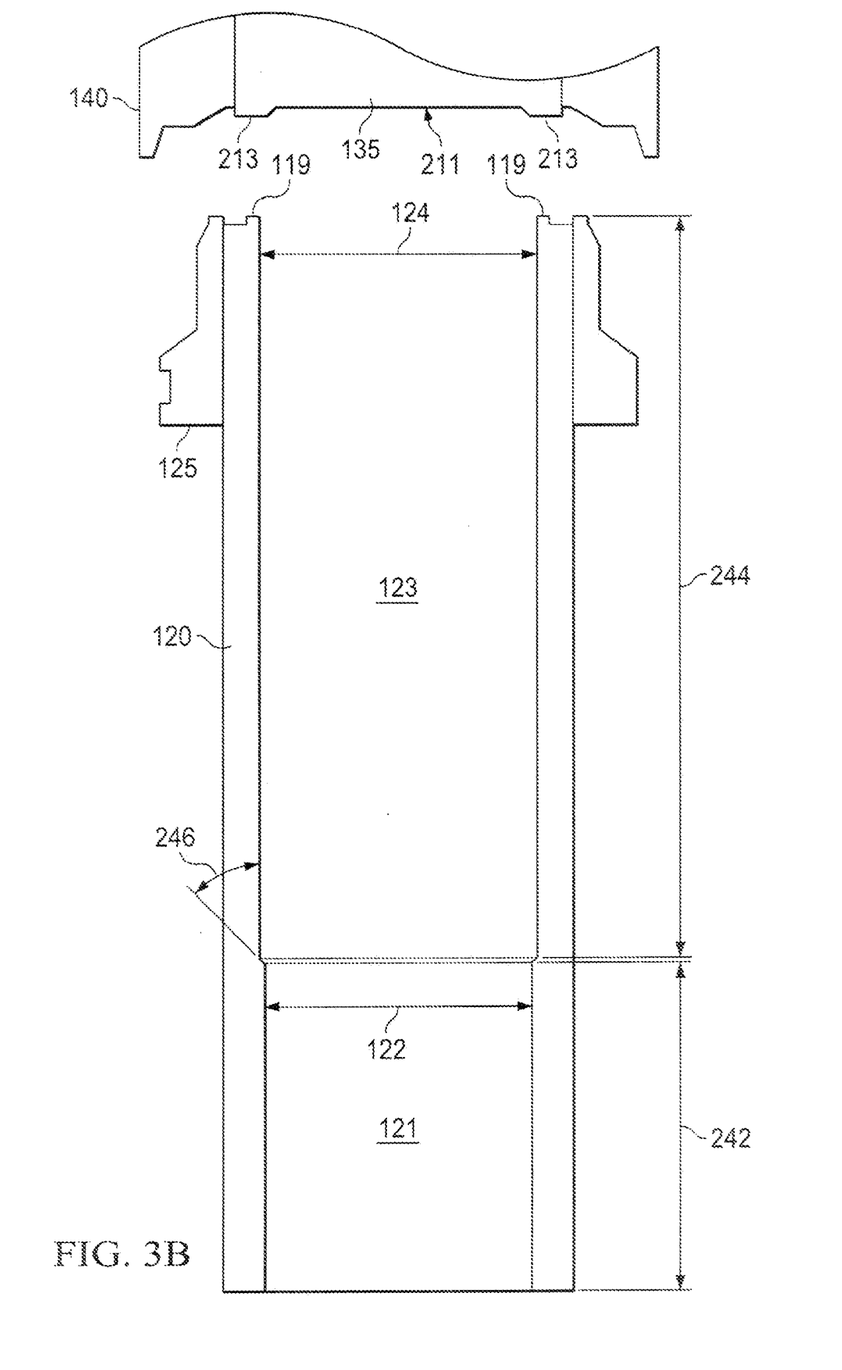
Figure 3C:
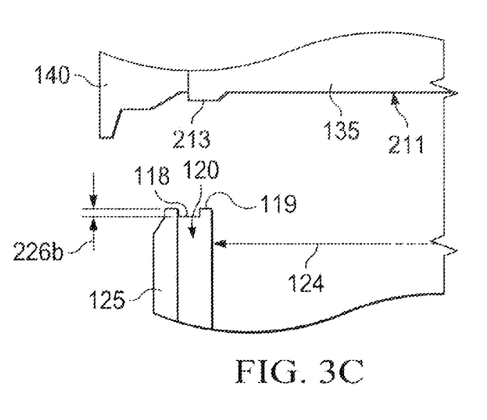
Figure 3D:
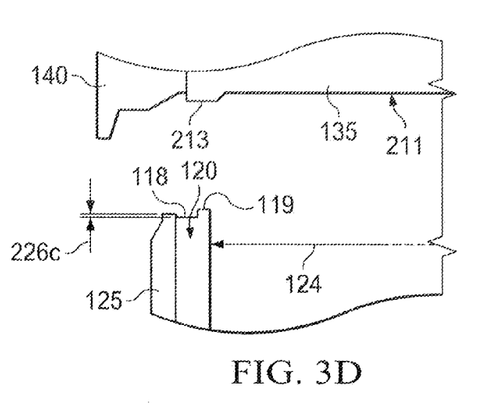
Figure 3E:
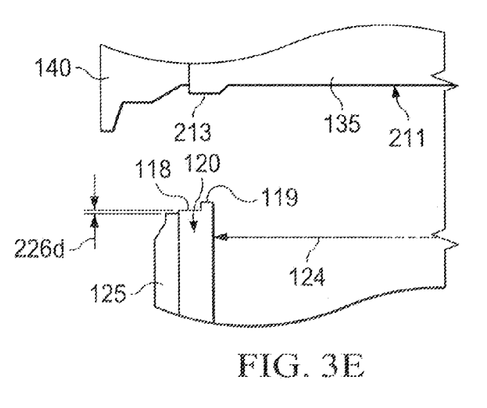
Figure 3F:
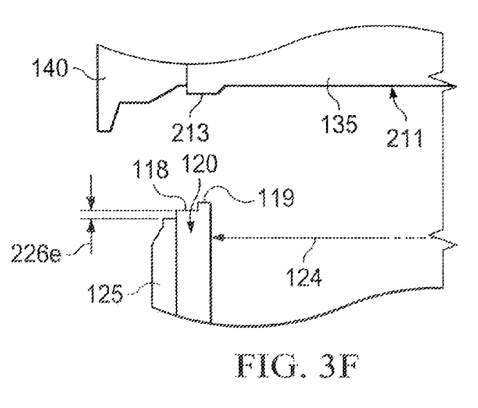

FIGS. 3A-F illustrate geometrical dimensions of one or more components of one implementation of the PRV 100. In some embodiments, the illustrated dimensions may allow for the PRV 100 to achieve optimal performance (e.g., meet one or more industry standards such as ASME Section VIII and/or API Stds. 521, 526, and/or 527) for set point repeatability, blowdown, relieving capacity, and chatter for both compressible and incompressible fluids without adjustment (e.g., changing) components of the PRV 100. Alternatively, other geometrical relationships may be used to achieve such optimal performance according to one or more equations found in Table 1 (below). In some embodiments, the constraint equations illustrated in Table 1 may be empirically derived through testing and/or experimentation. In addition, FIGS. 3A-C illustrate a pocket 211 of the disc 135, which, in the illustrated embodiment, is a recessed surface inside a seating surface 213 of the disc 135.

TABLE 1

Geometrical Relationships of PRV 100 components

| Reference Number | Dimension (in. or degrees) | Dimension Type | Constraint (Ratio ζ:δ) |
|---|---|---|---|
| 202 | 1.8611 * δ in. | Diameter | 0.7500 ≤ ζ/δ ≤ 0.9850 |
| 204 | 1.6937 * δ in. | Diameter | |
| 206 | 1.2404 * δ in. | Diameter | |
| 208 | 1.1763 * δ in | Diameter | |
| 210 | 0.9466 * δ in. | Diameter | |
| 234 | 1.0899 * δ in | Diameter | |
| 236 | 1.2734 * δ in. | Diameter | |
| 238 | 1.3606 * δ in. | Diameter | |
| 240 | 1.4470 * δ in. | Diameter | |
| 212 | 0.1790 * δ in | Length | 0.7500 ≤ ζ/δ ≤ 0.9850 |
| 214 | 0.1122 * δ in. | Length | |
| 222 | 0.02671 * δ in. | Length | |
| 224 | 0.02850 * δ in. | Length | |
| 226 | Constrained as shown in FIG. 3C | Length | |
| 228 | 0.03117 * δ in | Length | |
| 230 | 0.03206 * δ in. | Length | |
| 242 | Constrained by total height of nozzle 120 | Length | |
| 244 | 3.12 * dimension 242 in. | Length | |
| 216 | 72 degrees | Angle | 0.7500 ≤ ζ/δ ≤ 0.9850 |
| 218 | 30 degrees | Angle | 0.9500 ≤ ζ/δ ≤ 0.9850 |
| 218 | 101.1927 * (ζ/δ) + 127.3180 degrees | Angle | 0.7500 ≤ ζ/δ ≤ 0.9500 |
| 220 | 45 degrees | Angle | 0.7500 ≤ ζ/δ ≤ 0.9850 |
| 232 | 30 degrees | Angle | |
| 246 | 45 degrees | Angle | |

In some embodiments, the dimensions of the seat diameter 124 (represented as "δ") and the bore diameter 122 (represented as "ζ") and the relationship between these dimensions (i.e. constraint ratio) may provide a constraint on other referenced dimensions in the PRV 100, as shown in Table 1. For example, in order to determine the diameters, lengths, and angles shown in Table 1, the seat diameter 124 and the bore diameter 122 dimensions may be required as inputs to the constraint equations shown in this table. In addition, in some embodiments, an ideal ratio of the bore diameter 122 to the seat diameter 124 may be equal or substantially equal to 0.9617. Further, in some embodiments, the bore diameter 122 may be approximately equal to 1.080 and the seat diameter 124 may be approximately equal to 1.123. Table 2 (below) includes a description for each dimensional element illustrated in FIGS. 3A-C.

TABLE 2

Description of Dimensional Elements of FIGS. 3A-F

| Reference Number | Description |
|---|---|
| 202 | Outer Diameter Of Disc Holder |
| 204 | Disc Holder Outer Angle (216) Start Diameter |
| 206 | Disc Holder Inner Angle (218) Start Diameter |
| 208 | Disc Diameter |
| 210 | Disc Inner Angle Start Diameter/Disc Relief |
| 234 | Seat Land Outer Diameter |
| 236 | Outer Diameter Of Nozzle/Adjusting Ring Inner Diameter |
| 238 | Adjusting Ring Land Outer Diameter |
| 240 | Outer Diameter Of Adjusting Ring |
| 212 | Distance To Inner Angle (218) Start |
| 214 | Distance To Outer Angle (216) Start |
| 222 | Disc Relief Depth |
| 224 | Adjusting Ring Land Height |
| 226 | Distance Between Top Surface Of Nozzle And Top Edge Of Adjusting Ring Seat |
| 228 | Height Of Top Ridge Of Nozzle |
| 230 | Distance From Disc Seat To First Step Of Disc Holder Out Of The Pocket |
| 242 | Vertical Height Of Bore |
| 244 | Vertical Height Of Seat |
| 216 | Outer Angle On Disc Holder |
| 218 | Inner Angle On Disc Holder |
| 218 | Inner Angle On Disc Holder |
| 220 | Disc Inner Angle |
| 232 | Adjusting Ring Transition Angle |
| 246 | Bore To Seat Transition Angle |

While many of the referenced dimensions may be linearly related to the bore diameter 122 to seat diameter 124 ratio (as shown in Table 1), some dimensions may not be. As the nozzle height and inlet radius are typically known values (chosen based on, for example, base requirements, flange specifications, and other criteria), the dimension 242, an entrance length of the nozzle 120 (shown in FIG. 3B), may be approximated by the following empirical equation:

$$242 = \frac{nozzleheight - inletradius}{4.12}$$

In some embodiments, dimension 242 may be a function of a total height of the nozzle 120 (sum of dimensions 242, 244, and an inlet radius of the nozzle).

With reference to FIG. 3B, dimension 244 approximates a vertical height from the exit of the bore 121 to the seat 119. More specifically, in some embodiments, dimension 244 may represent a vertical height between a transition from the bore 121 to the seat inlet 123 and the top of the nozzle 120. In some embodiments, dimension 244 may depend on the relative height of dimension 242. In determining the relative heights of dimensions 242 and 244, the total height of the nozzle 120 may be taken into account.

With reference to FIG. 3A, angle 218 may be dependent on the constraint ratio of the bore diameter 122 to the seat diameter 124. For example, as shown in Table 1, angle 218 may be equal or substantially equal to 30 degrees when the constraint ratio is between approximately 0.9500 and approximately 0.9850. Angle 218 may be linearly related to the constraint ratio when the constrain ratio is between approximately 0.7500 and approximately 0.9500.

With reference to FIGS. 3C-F, these figures illustrate dimension 226 (shown as dimension 226b-226e) in different embodiments of the PRV 100. As illustrated, the nozzle 120 includes the seat 119 on a ridge 118 of the nozzle 120. Dimension 226 (shown as 226b-226e) represents a vertical distance between the ridge 118 of the nozzle 120 and the top of the adjusting ring 125 when the ring 125 is installed on the nozzle 120 and may be referred to as the "adjusting ring location." As illustrated, the adjusting ring 125 may be installed on the nozzle 120 resulting in dimension 226 having a variety of different values. In some embodiments, dimension 226 may be constrained such that the adjusting ring 125 does not penetrate the disc holder 140 when the PRV 100 is in the closed position (as shown in FIG. 2A).

In some embodiments, dimension 226 may be determined within any reasonable limits (as exemplified in FIGS. 3C-F) and may depend upon several factors, such as size of the inlet 110, set pressure requirements, and desired performance (e.g., blowdown, set pressure tolerance, PRV relief operation, chatter, and/or flutter). By varying dimension 226, performance of the PRV 100 may be adjusted. For instance, increasing dimension 226 by adjusting the adjusting ring 125 lower than the ridge 118 may result in a shorter blowdown with a raised resetting pressure but with increased "simmer" (e.g., an audible leak at the partially open position). Alternatively, increasing dimension 226 by adjusting the adjusting ring 125 higher than the ridge 118 may result in longer blowdown with a lower resetting pressure. While the illustrated embodiment of the PRV 100 includes a single adjusting ring 125, two adjusting rings may be used in other embodiments.

Utilization of a single adjusting ring 125, however, may result in particular advantages, such as controlling and/or adjusting blowdown with a single adjustment of the PRV 100. For example, when PRV 100 is in full lift (i.e., open state), a controlling factor for fluidic energy transfer from fluid 101 to the disc 135 and thus disc holder 140 and other components may be a momentum of the fluid 101. Transfer of energy from the fluid 101 due to the momentum may be based on direction and velocity of the fluid 101. In some embodiments, the adjusting ring 125 may control a flow profile (e.g., flow direction) of the fluid 101 when the PRV is in the open state. For example, if the adjusting ring 125 is raised, the flow of fluid 101 may be more directed upward, which may increase forces on the disc 135 and thus disc holder 140 and other components. This may result in increased lift and a subsequently longer blowdown. In contrast, if the adjusting ring 125 is lowered, the flow of fluid 101 may be less directed upward, which may decrease forces on the disc 135 and thus disc holder 140 and other components. This may result in decreased lift and a subsequently shorter blowdown. It should be noted that these changes in flow direction may be very small. Changes in blowdown from the highest adjusting ring position to the lowest (within reasonable values), however, may be approximately 5% (and/or other values, such as, as much as 20% or as little as 2%).

In certain embodiments utilizing the dimensions of the PRV 100 illustrated in Table 1, the PRV 100 may have better performance than conventional pressure relief valves that do not utilize such dimensions relationships. For example, Table 3 (below) illustrates performance (e.g., blowdown) data for both an incompressible fluid (i.e., water) and a compressible fluid (i.e., air) for the PRV 100 as compared to a conventional pressure relief valve. Of particular note, Table 3 illustrates data for the PRV 100 and a conventional pressure relief valve at two different media without adjustment of either valve (e.g., without changing components, including disc, disc holder, and/or nozzle, to account for the media). Further, in some embodiments, Table 3 illustrates data for the PRV 100 and a conventional pressure relief valve for two different media without modification of the corresponding adjusting rings of either valve. For example, one instance of a conventional pressure relief valve for a liquid application is Consolidated Model 1900LA safety relief valve provided by Dresser, Inc.

TABLE 3

Performance Comparison of PRV 100 to Conventional Pressure Relief Valve for Liquid Application

| Conventional Pressure Relief Valve designed for Liquid Application | | | | PRV 100 | | | |
|---|---|---|---|---|---|---|---|
| Media | set pressure (psi) | closing pressure (psi) | % Blowdown | Media | set pressure (psi) | closing pressure (psi) | % Blowdown |
| Water | 81.8 | 72.9 | | Water | 101.8 | 96.9 | |
| | 81.8 | 76.2 | | | 102.1 | 98.8 | |
| | 81.8 | 76.1 | | | 102.4 | 97.2 | |
| Average | 81.8 | 75.1 | 8.2% | Average | 102.1 | 97.6 | 4.4% |
| Air | 80.2 | 67.9 | | Air | 103.1 | 96.9 | |
| | 80.1 | 67.4 | | | 102.7 | 96.8 | |
| | 80.3 | 68.4 | | | 102.5 | 96.8 | |
| Average | 80.2 | 67.9 | 15.3% | Average | 102.8 | 96.8 | 5.8% |
| Water | 156.5 | 144.0 | | Water | 189.2 | 179.7 | |
| | 155.7 | 143.3 | | | 189.4 | 178.7 | |
| | 155.5 | 143.1 | | | 189.3 | 179.8 | |
| | 155.5 | 143.2 | | | | | |
| Average | 155.8 | 143.4 | 8.0% | Average | 189.3 | 179.4 | 5.2% |
| Air | 152.2 | 125.0 | | Air | 189.2 | 177.9 | |
| | 152.3 | 125.4 | | | 189.1 | 176.3 | |
| | 152.2 | 125.1 | | | 189.1 | 175.2 | |
| Average | 152.2 | 125.2 | 17.8% | Average | 189.1 | 176.5 | 6.7% |

As illustrated in Table 3, the PRV 100 performs better than the conventional liquid pressure relief valve on both liquid (i.e., water) and gas (i.e., air). More specifically, PRV 100, for example, meets certain industry standards for both liquid and as applications without change to any component of the PRV 100 or modifications/changes to the adjusting ring. For instance, industry standard ASME Boiler & Pressure Vessel Code Section VIII requires blowdown be less than or equal to 3 psi or 7% of set pressure, whichever is greater, in a gas service. As illustrated in Table 3, the PRV 100 meets this standard for both water and air (i.e., incompressible and compressible media) while the conventional pressure relief valve designed for liquid service has blowdown up to twice the standard when in a gas service.

A number of implementations have been described. Nevertheless, it will be understood that various modifications may be made. Accordingly, other implementations are within the scope of the following claims.

What is claimed is:

1. A pressure relief valve, comprising:
a base comprising a fluid inlet and a fluid outlet;
a bonnet attached to the base, the base and the bonnet defining a cavity in fluid communication with the fluid inlet and the fluid outlet;
a nozzle disposed within the fluid inlet and attached to the base, the nozzle having a first end comprising a substantially annular seat and a second end proximate the fluid inlet, the nozzle comprising a substantially cylindrical seat inlet that extends from the first end towards the second end, the substantially cylindrical seat having a seat diameter that defines the substantially cylindrical seat inlet from the substantially annular seat to a substantially cylindrical bore with a bore diameter proximate the second end, wherein the substantially cylindrical seat inlet is longer than the substantially cylindrical bore;
a disc disposed within a disc holder, the disc having a surface facing the fluid inlet to receive a first fluidic pressure, the disc adapted to contact the seat and seal the fluid inlet to substantially prevent fluid communication between the fluid inlet and the cavity when the valve is in a closed position, the disc and the disc holder adapted to be urged by an increase of the first fluidic pressure to a second fluidic pressure such that contact between the disc and the seat is removed at the second fluidic pressure to allow fluid communication between the fluid inlet and the cavity,
wherein the disc, the disc holder, and the nozzle have, respectively, a first dimension (d1), a second dimension (d2), and a third dimension (d3), with values that correspond to, $$d1 = x1 * \delta,$$

$$d2 = x2 * \delta,$$

$$d3 = x3 * \delta,$$

where $\delta$ is the seat diameter, x1 is a first constant, x2 is a second constant that is different from the second constant, and x3 is a third constant x3 that is different from the first constant x1 and the second constant x2,
wherein one of the first dimension (d1), the second dimension (d2), and the third dimension (d3) is further limited by a constraint ratio between the bore diameter and the seat diameter, and
wherein the first constant, the second constant, and the third constant have a value that permits operation of said pressure relief valve with a liquid media and a gas media.

2. The valve of claim 1, wherein the constraint ratio comprises a range, the range between approximately 0.7500 and approximately 0.9850, inclusive.

3. The valve of claim 2, the valve having a set pressure substantially equal to the second fluid pressure, the valve having a resealing pressure substantially equal to a third fluid pressure at the fluid inlet at which fluid communication is substantially ceased between the fluid inlet and the fluid outlet, wherein a difference between the set pressure and the resealing pressure is within approximately 7% of the set pressure during operation of the valve with a gas fluid when the constraint ratio is within the range.

4. The valve of claim 3, the valve having an overpressure substantially equal to approximately 110% of the set pressure, wherein fluid communication between the fluid inlet and the fluid outlet reaches a full capacity flow rate of the valve at the overpressure when the constraint ratio is within the range.

5. The valve of claim 2, the valve having a set pressure substantially equal to the second fluid pressure, the valve having a resealing pressure substantially equal to a third fluid pressure at the fluid inlet at which fluid communication is substantially ceased between the fluid inlet and the fluid outlet, wherein a difference between the set pressure and the resealing pressure is within approximately 10% of the set pressure during operation of the valve with a liquid fluid when the constraint ratio is within the range.

6. The valve of claim 5, the valve having an overpressure substantially equal to approximately 110% of the set pressure, wherein fluid communication between the fluid inlet and the fluid outlet reaches a full capacity flow rate of the valve at the overpressure when the constraint ratio is within the range.

7. The valve of claim 1, wherein an ideal constraint ratio is approximately 0.9617.

8. The valve of claim 1, wherein the one or more dimensions of the disc, the disc holder, and the nozzle are related to the seat diameter through empirically-derived constraint equations based on the constraint ratio.

9. The valve of claim 8, wherein the constraint equations comprise one or more of the following:
an outer diameter of the disc holder is substantially equal to 1.8611 times the seat diameter;
a disc holder outer angle start diameter is substantially equal to 1.6937 times the seat diameter;
a disc holder inner angle start diameter is substantially equal to 1.2404 times the seat diameter;
a disc diameter is substantially equal to 1.1763 times the seat diameter;
a disc inner angle start diameter is substantially equal to 0.9466 times the seat diameter;
a seat land outer diameter is substantially equal to 1.0899 times the seat diameter;
an outer diameter of the nozzle is substantially equal to 1.2734 times the seat diameter;
an outer diameter of a land of an adjusting ring is substantially equal to 1.3606 times the seat diameter;
an outer diameter of the adjusting ring is substantially equal to 1.4470 times the seat diameter;
a distance to the inner angle start diameter is substantially equal to 0.1790 times the seat diameter;
a distance to the outer angle start diameter is substantially equal to 0.1122 times the seat diameter;
a disc relief depth is substantially equal to 0.02671 times the seat diameter;
a height of the land of the adjusting ring is substantially equal to 0.02850 times the seat diameter;
a height of top ridge of the nozzle is substantially equal to 0.03117 times the seat diameter; and
a distance from a disc seat to a first step of the disc holder out of a pocket is substantially equal to 0.03206 times the seat diameter.

10. The valve of claim 8, wherein the constraint equations comprise one or more of the following:
an outer angle on the disc holder is substantially equal to 72 degrees;
an inner angle on the disc holder is substantially equal to 30 degrees when the constraint ratio is between approximately 0.9500 and approximately 0.9850, inclusive, and the inner angle on the disc holder is substantially equal to −101.1927 times the constraint ratio plus 127.3180 degrees when the constraint ratio is between approximately 0.7500, inclusive, and approximately 0.9500;
a disc inner angle is substantially equal to 45 degrees;
a transition angle of an adjusting ring is substantially equal to 30 degrees; and
a bore to seat transition angle is substantially equal to 45 degrees.

11. The valve of claim 3, further comprising an adjusting ring having a bore for receiving the nozzle therethrough.

12. The valve of claim 11, wherein the difference between the set pressure and the resealing pressure is based, at least in part, on the position of the adjusting ring on the nozzle.

13. The valve of claim 11, wherein one or more dimensions of the adjusting ring are functions of the seat diameter and limited by the constraint ratio.

14. A pressure relief valve, comprising:
a base comprising a fluid inlet and a fluid outlet, the valve having a set pressure substantially equal to a pressure at the fluid inlet at which fluid communication is established between the fluid inlet and the fluid outlet, the valve having a resealing pressure substantially equal to a pressure at the fluid inlet at which fluid communication is substantially ceased between the fluid inlet and the fluid outlet;
a bonnet attached to the base, the base and the bonnet defining a cavity in fluid communication with the fluid inlet and the fluid outlet;
a nozzle disposed within the fluid inlet and attached to the base, the nozzle having a first end comprising a substantially annular seat and a second end proximate the fluid inlet, the nozzle comprising a substantially cylindrical seat inlet that extends from the first end towards the second end, the substantially cylindrical seat having a seat diameter that defines the substantially cylindrical seat inlet from the substantially annular seat to a substantially cylindrical bore with a bore diameter proximate the second end, wherein the substantially cylindrical seat inlet is longer than the substantially cylindrical bore; and
a pressure control system configured to receive a first fluid and regulate the first fluid such that a difference between the set pressure and the resealing pressure is within a predetermined percentage of the set pressure during operation of the valve with the first fluid, the first fluid comprising one of substantially all gas or substantially all liquid, the pressure control system configured to receive a second fluid and regulate the second fluid such that a difference between the set pressure and the resealing pressure is within the predetermined percentage of the set pressure during operation of the valve with the second fluid, the second fluid comprising substantially all liquid if the first fluid is substantially all gas and substantially all gas if the first fluid is substantially all liquid,
wherein the disc, the disc holder, and the nozzle have, respectively, a first dimension (d1), a second dimension (d2), and a third dimension (d3), with values that correspond to, $d1 = x1*\delta,$ $d2 = x2*\delta,$ $d3 = x3*\delta.$ where δ is the seat diameter, x1 is a first constant, x2 is a second constant that is different from the second constant, and x3 is a third constant x3 that is different from the first constant x1 and the second constant x2, wherein one of the first dimension (d1), the second dimension (d2), and the third dimension (d3) is further limited by a constraint ratio between the bore diameter and the seat diameter, and wherein the first constant, the second constant, and the third constant have a value that permits operation of said pressure relief valve with the first fluid and the second fluid.

15. The valve of claim 14, wherein the pressure control system comprises:
    a disc having a landing surface adapted to sealingly engage the seat such that fluid communication between the fluid inlet and the cavity is substantially prevented; and
    a disc holder disposed within the cavity, the disc holder having an aperture adapted to engage and hold the disc.

16. The valve of claim 15, wherein the nozzle comprises a seat inlet having a seat diameter and a bore portion having a bore diameter, a ratio between the bore diameter and the seat diameter comprising a constraint ratio.

17. The valve of claim 16, wherein an ideal constraint ratio is approximately 0.9617.

18. The valve of claim 16, wherein the constraint ratio is between approximately 0.7500 and approximately 0.9850, inclusive.

19. The valve of claim 16, wherein one or more dimensions of at least one of the disc, the disc holder, and the nozzle are related to the seat diameter through empirically-derived constraint equations based on the constraint ratio.

20. The valve of claim 19, wherein the constraint equations comprise one or more of the following:
    an outer diameter of the disc holder is substantially equal to 1.8611 times the seat diameter;
    a disc holder outer angle start diameter is substantially equal to 1.6937 times the seat diameter;
    a disc holder inner angle start diameter is substantially equal to 1.2404 times the seat diameter;
    a disc diameter is substantially equal to 1.1763 times the seat diameter;
    a disc inner angle start diameter is substantially equal to 0.9466 times the seat diameter;
    a seat land outer diameter is substantially equal to 1.0899 times the seat diameter;
    an outer diameter of the nozzle is substantially equal to 1.2734 times the seat diameter;
    an outer diameter of a land of an adjusting ring is substantially equal to 1.3606 times the seat diameter;
    an outer diameter of the adjusting ring is substantially equal to 1.4470 times the seat diameter; a distance to the inner angle start diameter is substantially equal to 0.1790 times the seat diameter;
    a distance to the outer angle start diameter is substantially equal to 0.1122 times the seat diameter;
    a disc relief depth is substantially equal to 0.02671 times the seat diameter;
    a height of the land of the adjusting ring is substantially equal to 0.02850 times the seat diameter;
    a height of top ridge of the nozzle is substantially equal to 0.03117 times the seat diameter; and
    a distance from a disc seat to a first step of the disc holder out of a pocket is substantially equal to 0.03206 times the seat diameter.

21. The valve of claim 19, wherein the constraint equations comprise one or more of the following:
    an outer angle on the disc holder is substantially equal to 72 degrees;
    an inner angle on the disc holder is substantially equal to 30 degrees when the constraint ratio is between approximately 0.9500 and approximately 0.9850, inclusive, and the inner angle on the disc holder is substantially equal to −101.1927 times the constraint ratio plus 127.3180 degrees when the constraint ratio is between approximately 0.7500, inclusive, and approximately 0.9500;
    a disc inner angle is substantially equal to 45 degrees;
    a transition angle of an adjusting ring is substantially equal to 30 degrees; and
    a bore to seat transition angle is substantially equal to 45 degrees.

22. A method for using a pressure relief valve having a base comprising a fluid inlet and a fluid outlet, the valve having a set pressure substantially equal to a pressure at the fluid inlet at which fluid communication is established between the fluid inlet and the fluid outlet, the valve having a resealing pressure substantially equal to a pressure at the fluid inlet at which fluid communication is substantially ceased between the fluid inlet and the fluid outlet, the method comprising:
    providing a liquid to the fluid inlet such that a difference between the set pressure and the resealing pressure is within a predetermined percentage of the set pressure during operation of the valve with the liquid; and
    without modifying the valve, providing a gas to the fluid inlet such that a difference between the set pressure and the resealing pressure is within the predetermined percentage of the set pressure during operation of the valve with the gas,
    wherein the pressure relief valve comprises a nozzle disposed within the fluid inlet and attached to the base, the nozzle having a first end comprising a substantially annular seat and a second end proximate the fluid inlet, the nozzle comprising a substantially cylindrical seat inlet that extends from the first end towards the second end, the substantially cylindrical seat having a seat diameter that defines the substantially cylindrical seat inlet from the substantially annular seat to a substantially cylindrical bore with a bore diameter proximate the second end, wherein the substantially cylindrical seat inlet is longer than the substantially cylindrical bore,
    wherein the disc, the disc holder, and the nozzle have, respectively, a first dimension (d1), a second dimension (d2), and a third dimension (d3), with values that correspond to, $d1 = x1*\delta,$ $d2 = x2*\delta,$ $d3 = x3*\delta,$ where δ is the seat diameter, x1 is a first constant, x2 is a second constant that is different from the second constant, and x3 is a third constant x3 that is different from the first constant x1 and the second constant x2, wherein one of the first dimension (d1), the second dimension (d2), and the third dimension (d3) is further limited by a constraint ratio between the bore diameter and the seat diameter, and wherein the first constant, the second constant, and the third constant have a value that permits operation of said pressure relief valve with the liquid and the gas.

23. The method of claim 22, wherein the predetermined percentage is approximately 10 percent.

24. The method of claim 22, wherein providing a liquid to the fluid inlet such that a difference between the set pressure and the resealing pressure is within a predetermined percentage of the set pressure during operation of the valve with the liquid comprises providing a liquid to the fluid inlet such that a difference between the set pressure and the resealing pressure is within a first predetermined percentage of the set pressure during operation of the valve with the liquid, and wherein without modifying the valve, providing a gas to the fluid inlet such that a difference between the set pressure and the resealing pressure is within the predetermined percentage of the set pressure during operation of the valve with the gas comprises, without modifying the valve, providing a gas to the fluid inlet such that a difference between the set pressure and the resealing pressure is within a second predetermined percentage of the set pressure during operation of the valve with the gas.

25. The method of claim 24, wherein the first predetermined percentage is approximately equal to 10%, and the second predetermined percentage is approximately equal to 7%.

26. The method of claim 22, wherein the valve further comprises a nozzle disposed in the fluid inlet and an adjusting ring disposed around an outer surface of the nozzle at a first position, such that the difference between the set pressure and the resealing pressure is within the predetermined percentage of the set pressure during operation of the valve with the liquid and the gas when the adjusting ring is at the first position, the method further comprising:
adjusting the adjusting ring along the nozzle in a direction toward the fluid inlet to a second position different from the first position, such that the difference between the set pressure and the resealing pressure is with a second percentage of the set pressure less than the predetermined percentage during operation of the valve with the liquid and the gas when the adjusting ring is at the second position.

27. A method for using a pressure relief valve having a base comprising a fluid inlet and a fluid outlet, the valve having a set pressure substantially equal to a pressure at the fluid inlet at which fluid communication is established between the fluid inlet and the fluid outlet, the valve having a resealing pressure substantially equal to a pressure at the fluid inlet at which fluid communication is substantially ceased between the fluid inlet and the fluid outlet, the method comprising:
providing a gas to the fluid inlet such that a difference between the set pressure and the resealing pressure is within a predetermined percentage of the set pressure during operation of the valve with the gas; and
without modifying the valve, providing a liquid to the fluid inlet such that a difference between the set pressure and the resealing pressure is within the predetermined percentage of the set pressure during operation of the valve with the liquid,
wherein the pressure relief valve comprises a nozzle disposed within the fluid inlet and attached to the base, the nozzle having a first end comprising a substantially annular seat and a second end proximate the fluid inlet, the nozzle comprising a substantially cylindrical seat inlet that extends from the first end towards the second end, the substantially cylindrical seat having a seat diameter that defines the substantially cylindrical seat inlet from the substantially annular seat to a substantially cylindrical bore with a bore diameter proximate the second end, wherein the substantially cylindrical seat inlet is longer than the substantially cylindrical bore,
wherein the disc, the disc holder, and the nozzle have, respectively, a first dimension (d1), a second dimension (d2), and a third dimension (d3), with values that correspond to, $d1 = x1*\delta,$ $d2 = x2*\delta,$ $d3 = x3*\delta,$ where $\delta$ is the seat diameter, x1 is a first constant, x2 is a second constant that is different from the second constant, and x3 is a third constant x3 that is different from the first constant x1 and the second constant x2,
wherein one of the first dimension (d1), the second dimension (d2), and the third dimension (d3) is further limited by a constraint ratio between the bore diameter and the seat diameter, and
wherein the first constant, the second constant, and the third constant have a value that permits operation of said pressure relief valve with the liquid and the gas.

28. The method of claim 27, wherein the predetermined percentage is approximately 10 percent.

29. The method of claim 27, wherein providing a gas to the fluid inlet such that a difference between the set pressure and the resealing pressure is within a predetermined percentage of the set pressure during operation of the valve with the gas comprises providing a gas to the fluid inlet such that a difference between the set pressure and the resealing pressure is within a first predetermined percentage of the set pressure during operation of the valve with the gas, and wherein without modifying the valve, providing a liquid to the fluid inlet such that a difference between the set pressure and the resealing pressure is within the predetermined percentage of the set pressure during operation of the valve with the liquid comprises, without modifying the valve, providing a liquid to the fluid inlet such that a difference between the set pressure and the resealing pressure is within a second predetermined percentage of the set pressure during operation of the valve with the liquid.

30. The method of claim 29, wherein the first predetermined percentage is approximately equal to 7%, and the second predetermined percentage is approximately equal to 10%.

31. The method of claim 27, wherein the valve further comprises an adjusting ring disposed around an outer surface of the nozzle at a first position, such that the difference between the set pressure and the resealing pressure is within the predetermined percentage of the set pressure during operation of the valve with the liquid and the gas when the adjusting ring is at the first position, and wherein the method further comprises adjusting the adjusting ring along the nozzle in a direction toward the fluid inlet to a second position different from the first position, such that the difference between the set pressure and the resealing pressure is with a second percentage of the set pressure less than the predetermined percentage during operation of the valve with the liquid and the gas when the adjusting ring is at the second position.

* * * * *